(12) United States Patent
Afgani (10) Patent No.: US 11,387,900 B2
(45) Date of Patent: Jul. 12, 2022

(54) OPTICAL WIRELESS COMMUNICATION

(71) Applicant: pureLiFi Limited, Edinburgh (GB)

(72) Inventor: Mostafa Afgani, Edinburgh (GB)

(73) Assignee: PURELIFI LIMITED, Edinburgh (GB)

( * ) Notice: Subject to any disclaimer, the term of this patent is extended or adjusted under 35 U.S.C. 154(b) by 61 days.

(21) Appl. No.: 16/756,087

(22) PCT Filed: Oct. 11, 2018

(86) PCT No.: PCT/GB2018/052920
§ 371 (c)(1),
(2) Date: Apr. 14, 2020

(87) PCT Pub. No.: WO2019/077315
PCT Pub. Date: Apr. 25, 2019

(65) Prior Publication Data
US 2021/0194585 A1 Jun. 24, 2021

(30) Foreign Application Priority Data
Oct. 16, 2017 (GB) ..................... 1716955

(51) Int. Cl.
*H04B 10/00* (2013.01)
*H04B 10/114* (2013.01)
(Continued)

(52) U.S. Cl.
CPC ....... *H04B 10/1143* (2013.01); *H04B 10/502* (2013.01); *H04B 10/516* (2013.01); *H04B 10/60* (2013.01)

(58) Field of Classification Search
CPC ... H04B 10/116; H04B 10/114; H04B 10/112; H04B 10/1141; H04B 10/1143;
(Continued)

(56) References Cited

U.S. PATENT DOCUMENTS 9,432,117 B2 * 8/2016 Chen ................. H04B 10/116
2009/0208221 A1 8/2009 Hiroyuki
(Continued)

OTHER PUBLICATIONS

UKIPO; Search Report dated Mach 26, 2019 in Application No. GB 1716955.8.
(Continued)

*Primary Examiner* — Hanh Phan
(74) *Attorney, Agent, or Firm* — Snell & Wilmer L.L.P.

(57) ABSTRACT

An optical wireless communication (OWC) transmitter comprising a baseband chip comprises: a media access control (MAC) layer configured to receive data from a network; a first physical (PHY) layer associated with a first light source; and a second physical (PHY) layer associated with a second light source; wherein the first PHY layer is configured to receive first data from the MAC layer and provide a first signal to the first light source, so as to drive the first light source to emit first modulated light that comprises or is representative of the first data; and the second PHY layer is configured to receive second data from the MAC layer and provide a second signal to the second light source, so as to drive the second light source to emit second modulated light that comprises or is representative of the second data.

19 Claims, 2 Drawing Sheets

(51) Int. Cl.
H04B 10/50 (2013.01)
H04B 10/516 (2013.01)
H04B 10/60 (2013.01)

(58) Field of Classification Search
CPC .......... H04B 10/1149; H04B 10/1123; H04B 10/1125; H04B 10/502; H04B 10/516; H04B 10/40
USPC ....... 398/172, 118, 119, 127, 128, 130, 129, 398/131, 135, 136, 158, 159, 124
See application file for complete search history.

(56) References Cited

U.S. PATENT DOCUMENTS

2012/0114327 A1   5/2012   Bae et al.
2015/0281057 A1   10/2015  Thubert et al.

OTHER PUBLICATIONS

Bouchet et al., "Hybrid wireless optics (HWO): Building the next-generation home network," 2008 6th International Symposium on Communication Systems, Networks and Digital Signal Processing, Graz, 2008, pp. 283-287.

Bouchet et al., "Wireless Optical Network for a Home Network", Proc. of SPIE, vol. 7814, Aug. 2010.

Bouchet et al., "Broadcast of four HD videos with LED ceiling lighting: optical-wireless MAC," Proc. SPIE 8162, Free-Space and Atmospheric Laser Communications XI, 81620L, Sep. 14, 2011.

O'Brien et al., "High data-rate infra-red optical wirelesscommunications: Implementation challenges," 2010 IEEE Globecom Workshops, Miami, FL, 2010, pp. 1047-1051.

Institute of Electrical and Electronics Engineers, IEEE Standard 802.15. 7, IEEE Standard for Short-Range Wireless, 2011. 2, 36, 40 and 43.

ISA; International Search Report dated Jan. 16, 2019 in Application No. PCT/GB2018/052920.

OMEGA White Paper et al: "Seventh Framework Programme Theme 3 Information & Communication Technologies (ICT) ICT-213311 OMEGA White Paper: "Inter-MAC concept for Gbps Home Network"", Apr. 9, 2009 (Apr. 9, 2009), XP055182567, Retrieved from the Internet <URL:http://www.ict-omega.eu/fileadmin/documents/presentations/White_Paper/Omega_White_Paper.pdf> [retrieved on Apr. 13, 2015].

IB; International Preliminary Report on Patentability dated Apr. 21, 2020 in Application No. PCT/GB2018/052920.

* cited by examiner

OPTICAL WIRELESS COMMUNICATION

CROSS-REFERENCE TO RELATED APPLICATIONS

This application is a national stage application of PCT/GB2018/052920, filed on Oct. 11, 2018, which claims priority to GB Application No. 1716955.8, filed on Oct. 16, 2017, which are hereby incorporated by reference in their entirety for all purposes.

FIELD

The present invention relates optical wireless communication, for example to an optical wireless communication transmitter.

BACKGROUND

It is known to provide wireless data communications by using light instead of radio frequencies to transmit and receive data wirelessly between devices. Data may be transmitted using light by modulating an intensity of the light. The light used may be coherent or incoherent. Methods that use light to transmit data wirelessly may be referred to as optical wireless communications (OWC) or light communications (LC).

Wireless networks using light for data transmission may in some circumstances allow a higher data capacity and greater energy efficiency than radio frequency wireless networks, and may also be used to replace point-to-point infrastructure in locations where conventional infrastructure does not exist or is too expensive to build.

There is a challenge for OWC systems to continue to increase data delivery. For example, next generation chip sets for fully duplexed OWC are aiming to deliver at data rates greater than 1 Gbps. This may not be feasible with current off the shelf luminaires due to the limitations of the light source used.

Wave division multiplexing (WDM) and multiple input, multiple output (MIMO) technology both may boost overall capacity or data rate through multiplexing gain. In WDM and MIMO, multiple emitters, possibly having different wavelengths, may be used for sending the same or different information. However, for both methods basic performance characteristics such as bandwidth of all channels are necessarily the same or very similar.

SUMMARY

Certain embodiments relate to a system in which two light emitters may be driven by two physical (PHY) layers of different performance levels, both of the PHYs being controlled by the same media access control (MAC) layer, which may allow the same chipset to manage different classes of users and/or devices seamlessly.

According to a first aspect, there is provided an optical wireless communication (OWC) transmitter comprising: a media access control (MAC) layer configured to receive data from a network; a first physical (PHY) layer; and a second physical (PHY) layer associated; wherein the first PHY layer is configured to receive first data from the MAC layer and provide a first signal that comprises or is representative of the first data; and the second PHY layer is configured to receive second data from the MAC layer and provide a second signal that comprises or is representative of the second data.

The OWC transmitter may comprise a chip comprising the MAC layer, first PHY layer and second PHY layer. The chip may be a baseband chip.

The first PHY layer may be associated with a first light source. The first PHY layer may be configured to provide the first signal to the first light source, so as to drive the first light source to emit first modulated light that comprises or is representative of the first data. The second PHY layer may be associated with a second light source. The second PHY layer may be configured to provide the second signal to the second light source, so as to drive the second light source to emit second modulated light that comprises or is representative of the second data.

A single MAC layer may be used in combination with two PHY layers to provide two data streams. By using a single MAC layer and two PHY layers, support may be provided for multiple different PHY protocols. The unified single MAC layer and two PHY layers may allow data to be sent to a mix of devices with different capabilities. In some circumstances, the data may be sent to different devices without the network layer determining how the data is to be sent.

Providing the single MAC layer and two PHY layers on a single chip may be lower cost and/or lower complexity than a design in which multiple chips are used, for example two chips each with a respective MAC layer and PHY layer. A single MAC layer may be more efficient and/or cost-effective than a plurality of MAC layers.

The light may comprise visible light and/or non-visible light. For example, light may comprise visible light, infra-red light or ultra-violet light. Optionally, the light may comprise electromagnetic waves with wavelengths in a range 1 nm to 1 mm, optionally in a range 1 nm to 2500 nm, which includes ultraviolet, visible light and near-infra-red wavelengths.

The first modulated light may be visible light. The second modulated light may be non-visible light. The second modulated light may be infrared light. The second modulated light may be ultraviolet light. Using non-visible light for the second modulated light may allow an intensity of that light to be independent of a level of visible illumination. In some circumstances, a higher intensity may be used than could be used if the light were visible. Using non-visible light for the second modulated light may allow data to be transmitted using the second PHY layer and second light source even in a dark room, or in low levels of lighting.

The first light source may comprise at least one of a light-emitting diode (LED), a laser, a VCSEL (vertical-cavity surface-emitting laser), a VCSEL array, a laser diode, or an LEP (light-emitting plasma). The second light source may comprise at least one of a light-emitting diode (LED), a laser, a VCSEL (vertical-cavity surface-emitting laser), a VCSEL array, a laser diode, or an LEP (light-emitting plasma). The first and second light sources may be different types of light sources.

The first light source may comprise at least one light-emitting diode (LED). The second light source may comprise at least one of a laser, a VCSEL, a VCSEL array. By using different types of light sources, the light sources may have different properties, for example different intensity or power consumption.

The first data may be different from the second data. Providing different first and second data from the first PHY layer and second PHY layer may allow different data streams to be sent to different devices. For example data may be sent to multiple different stations at once.

The first and second PHY layers may be configured to operate substantially simultaneously, such that the first modulated light and second modulated light are emitted substantially simultaneously. Different data may be sent to different devices simultaneously.

The first data may be the same as the second data. The first data may be encoded differently from the second data.

The second light source may have a higher performance than the first light source. The second light source may have a larger bandwidth than the first light source. By using the second light source only when it is needed, power may be conserved. For example, the second light source may be used only for high-speed applications.

For applications where the two PHY layers are targeted at very different applications (for example the second PHY layer is targeted at a high speed application and the first PHY layer is targeted at a low speed application), significant efficiency and/or power savings may be had by only utilising the appropriate PHY at any given time. For example, when there are only low speed devices in the network, the second PHY layer (which may be high speed and/or power hungry) may be switched off.

An infrared emitter may be driven from a high performance PHY and a standard visible light luminaire may be driven from a lower power, lower performance PHY.

The first light source may have a different field of view than the second light source. The first light source may have a different coverage area than the second light source. The first and second light source may illuminate different regions of space. The first light source may have a different orientation to the second light source. Illumination of different areas (for example, due to different positions and/or orientations of the light sources) may facilitate the sending of data to devices that are spatially separated.

The second PHY layer may be configured to transmit data at a higher bandwidth than the first PHY layer.

The first and second modulated light may each be modulated at a respective modulation rate. The or each modulation rate may be at least 1 kHz, optionally at least 100 kHz, further optionally at least 1 MHz. The or each modulation rate may be less than 1 PHz, further optionally less than 1 THz, further optionally less than 100 GHz, further optionally less than 10 GHz.

The first and second modulated light may each be modulated with a respective modulation scheme comprising at least one of on-off keying (OOK), phase shift keying (PSK), M-ary pulse amplitude modulation (M-PAM), M-ary quadrature amplitude modulation (M-QAM) or orthogonal frequency division multiplexing (OFDM), Discrete Hartley transformation, Wavelet packet division multiplexing (WPDM), Hadamard coded modulation (HCM), pulse-position modulation (PPM), Colour shift keying (CSK), carrier-less amplitude and phase (CAP), discrete multi-tone (DMT). The modulation may be coherent or incoherent.

The transmitter may comprise or form part of an OWC access point.

The transmitter may be integrated into a luminaire comprising the first and/or second light sources. The integration of the transmission into the luminaire may provide compatibility with existing lighting systems and/or OWC systems.

In a further aspect, which may be provided independently, there is provided a baseband chip comprising: a media access control (MAC) layer configured to receive data from a network; a first physical (PHY) layer associated with a first light source; and a second physical (PHY) layer associated with a second light source; wherein the first PHY layer is configured to receive first data from the MAC layer and provide a first signal to the first light source, so as to drive the first light source to emit first modulated light that comprises or is representative of the first data; and the second PHY layer is configured to receive second data from the MAC layer and provide a second signal to the second light source, so as to drive the second light source to emit second modulated light that comprises or is representative of the second data.

In a further aspect, which may be provided independently, there is provided a method of data transmission by optical wireless communication, comprising receiving by a MAC layer data from a network; receiving by a first PHY layer first data from the MAC layer; providing by the first PHY layer a first signal to a first light source, so as to drive the first light source to emit first modulated light that comprises or is representative of the first data; receiving by a second PHY layer second data from the MAC layer; and providing by the second PHY layer a second signal to a second light source, so as to drive the second light source to emit second modulated light that comprises or is representative of the second data.

In a further aspect, which may be provided independently, there is provided a system comprising an OWC transmitter as claimed or described herein, and an OWC receiver apparatus, the OWC receiver apparatus comprising at least one receiving device configured to receive at least part of the first modulated light and second modulated light emitted by the first light source and second light source.

The at least one receiving device may comprise a first receiving device configured to receive the at least part of the first modulated light, and a second receiving device configured to receive the at least part of the second modulated light. The first receiving device may comprise at least one photodiode. The second receiving device may comprise at least one photodiode.

The second receiving device may have a higher gain and/or sensitivity than the first receiving device. In some circumstances, the higher gain or sensitivity of the second receiving device may allow a larger signal to be received by the second receiving device than the first receiving device, even when the transmitted power of the second light source is less than the first light source.

Features in one aspect may be applied as features in any other aspect in any suitable combination. For example, device features may be applied as method features and vice versa.

BRIEF DESCRIPTION OF THE DRAWINGS

Various embodiments will now be described by way of example only, and with reference to the accompanying drawings, of which.

DETAILED DESCRIPTION OF THE DRAWINGS

Figure 1:
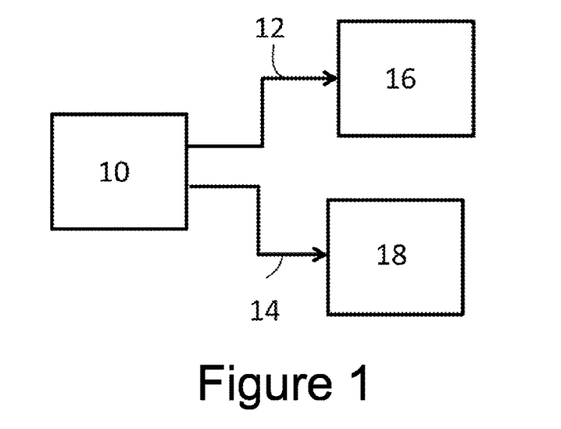
FIG. 1 is a schematic diagram of an optical wireless communication system.

FIG. 1 is a schematic block diagram illustrating an optical wireless communication system according to an embodiment. A transmitter apparatus 10 is configured to send a first wireless optical signal in which first data is encoded through a first optical channel 12 to a first receiver apparatus 16. The transmitter apparatus 10 is configured to send a second wireless optical signal in which second data is encoded through a second optical channel 14 to a second receiver apparatus 18. The optical communication channels 12, 14 may be free-space communication channels. Each of the optical communication channels 12, 14 has a characteristic optical wavelength. The characteristic optical wavelength of the second optical communication channel 14 is different from the characteristic optical wavelength of the first optical communication channel 12.

The transmitter apparatus 10 may in some embodiments comprise an OWC communication device. The transmitter apparatus 10 may comprise an OWC access point.

The transmitter apparatus 10 may support a bi-directional communication protocol. The transmitter apparatus 10 may support any suitable communication protocol, for example IEEE 802.15.7, 802.15.13, 802.11 or extensions or developments thereof; ITU-T G.9960 or extensions or developments thereof; or ITU-T G.vlc or extensions or developments thereof.

In some embodiments, each of the optical communication channels 12, 14 comprises a respective LiFi communication channel. A LiFi communication channel may have various desirable characteristics, for example it may have a range of up to 20 m or more, and a transmission cone in a range of 60 degrees to 90 degrees in some arrangements. It has high bandwidth in comparison with for example RF or IrDA (Infrared Data Association) protocols. Full duplex is possible by using two frequencies or frequency ranges allowing high throughput speeds, e.g. halving time or doubling bandwidth of communication. Reception bandwidth is independent of transmission bandwidth, and therefore there may potentially be twice the bandwidth available for the communication exchange. It may be difficult to fake due to complexity of protocol and data stream format. It is possible to spectrum hop, for example.

In the present embodiment, the transmitter apparatus 10 comprises a luminaire, which is part of an overhead lighting system. Each receiver apparatus 16, 18 forms part of a respective user device, for example a mobile device or dongle. In other embodiments the transmitter apparatus 10 and receiver apparatuses 16, 18 may each comprise or form part of any suitable device, for example any device configured to transmit and/or receive OWC data. The transmitter apparatus 10 may comprise or form part of an OWC access point, while the receiver apparatuses 16, 18 may each comprise or form part of a respective OWC station.

In further embodiments, a single receiver apparatus is configured to receive both the first wireless signal sent over the first wireless communication channel 12, and the second wireless signal sent over the second wireless communication channel 14.

In the present embodiment, the optical communication channels 12, 14 are used to send downlink information from the luminaire 10 to the user devices 16, 18.

Figure 2:
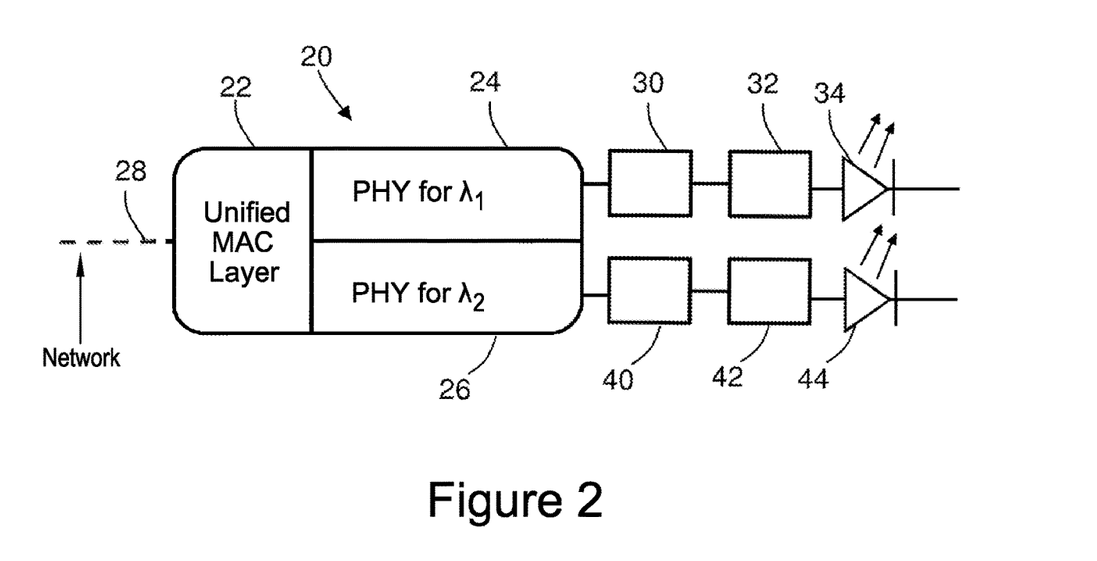
FIG. 2 is a schematic diagram of an optical wireless transmitter apparatus.

FIG. 2 is a schematic diagram of certain components of the transmitter apparatus 10. Transmitter apparatus 10 comprises a chip 20 which comprises a MAC layer 22, a first PHY layer 24 and a second PHY layer 26. The chip 20 may be referred to as a baseband chip. The chip 20 may comprise a single encapsulated unit. The chip 20 may comprise at least one integrated circuit, which may be application-specific. The chip 20 may comprise at least one input, at least one output, and circuitry for performing MAC layer and PHY layer operations.

The MAC layer 22 may be referred to as a unified MAC layer. Transmitter apparatus 10 further comprises a network connection 28. Transmitter apparatus 10 further comprises a first digital to analogue connection (DAC) 30, a first amplifier 32, a first light source 34, a second DAC 40, a second amplifier 42 and a second light source 44. The transmitter apparatus 10 may also comprise further components that are not shown in FIG. 2 for clarity.

In the present embodiment, functionality of the MAC layer, first PHY layer and second PHY layer 26 are each provided by software. In other embodiments, any suitable software, hardware, or combination of software and hardware may be used.

The MAC layer 22 of baseband chip 20 is configured to receive data from a network (not shown) over the network connection 28. In the present embodiment, the data received from the network comprises Ethernet data.

The MAC layer 22 is configured to process the data received from the network in accordance with at least one medium access protocol to create frames, and to pass the frames to the first and second PHY layers 24, 26. The MAC layer 22 may provide, for example, contention and channel sharing. The functionality of the MAC layer 22 may be in accordance with, for example, IEEE 802.15.7, 802.15.13, 802.11 or extensions or developments thereof; ITU-T G.9960 or extension or developments thereof; or ITU-T G.vlc or extensions or developments thereof.

The first PHY layer 24 and second PHY layer 26 are each configured to process frames received by the MAC layer to generate PHY frames that are suitable by physical transmission. The processing of the frames received from the MAC layer may include, for example, modulation using a suitable modulation scheme, and adding a PHY header. The functionality of each PHY layer 24, 26 may be in accordance with, for example, IEEE 802.15.7, 802.15.13, 802.11 or extensions or developments thereof; ITU-T G.9960 or extension or developments thereof; or ITU-T G.vlc or extensions or developments thereof.

Any suitable modulation scheme may be used by each of the PHY layers 24, 26, for example on-off keying (OOK), phase shift keying (PSK), M-ary pulse amplitude modulation (M-PAM), M-ary quadrature amplitude modulation (M-QAM) or orthogonal frequency division multiplexing (OFDM), Discrete Hartley transformation, Wavelet packet division multiplexing (WPDM), Hadamard coded modulation (HCM), pulse-position modulation (PPM), Colour shift keying (CSK), carrier-less amplitude and phase (CAP), discrete multi-tone (DMT). In some embodiments, the different PHY layers 24, 26 use the same modulation scheme. In other embodiments, different modulation schemes are used by the different PHY layers 24, 26.

In the embodiment shown in FIG. 2, the first PHY layer 24 is configured to output a first digital signal to the first DAC 30. The first digital signal comprises PHY frames in which first data is encoded.

The first DAC 30 is configured to convert the digital signal output by the first PHY layer 24 into an analogue signal which is then amplified by the first amplifier 32. The amplified signal from the first amplifier 32 drives the first light source 34 to emit modulated light having a first characteristic wavelength.

The second PHY layer 26 is configured to output a second digital signal to the second DAC 40. The second digital signal comprises PHY frames in which second data is encoded.

The second DAC 40 is configured to convert the digital signal output by the second PHY layer 26 into an analogue signal which is then amplified by the second amplifier 42. The amplified signal from the second amplifier 42 drives the second light source 44 to emit modulated light having a second, different characteristic wavelength.

In further embodiments, each DAC and/or amplifier may be considered to form part of its respective PHY layer. Any suitable configuration of components may be used.

In the embodiment of FIG. 2, each of the first light source 34 and second light source 44 comprises a respective LED light source, which may comprise one or more LEDs. In other embodiments, each of first and second light sources 34, 44 may comprise any suitable light source, for example a laser, a VCSEL (vertical-cavity surface-emitting laser), a laser diode, or an LEP (light-emitting plasma). Each of the first and second light sources 34, 44 may comprise a plurality of light sources, for example an array of light sources.

The first light source 34 has a first characteristic wavelength. The first light source 34 is used to transmit data on the first optical communication channel 12. The second light source 44 has a second, different characteristic wavelength. The second light source 44 is used to transmit data on the second optical communication channel 14.

In the embodiment of FIG. 2, different data is output by the first PHY layer and the second PHY layer. Two data streams are produced, which may be received by different receivers (for example, different stations). The different data may be provided concurrently. Providing different data over a first optical communication channel 12 and a second optical communication channel 14 may enable data to be sent to multiple stations at once.

In further embodiments, the first and second PHY layers 24, 26 are configured to output the same data. In some embodiments, the same signal is provided by the first and second PHY layers 24, 26 at the same time. In some embodiments, the same signal is provided by the first and second PHY layers 24, 26, but the signal is encoded differently by the second PHY layer 26 than by the first PHY layer 24. In some embodiments, the same signal is provided by the first and second PHY layers 24, 26, but the signal is sent by each PHY layer 24, 26 at a different time.

In some embodiments, a first PHY protocol is supported by the first PHY layer 24 and a second, different PHY protocol is supported by the second PHY layer 26. The different protocols may be used to support different receiver devices, for example different types of receiver devices.

In one embodiment, the first light source 34 is an LED light source, which may be considered to be a lower-performance data source, while the second light source 44 is an infrared laser light source providing high performance output. The second light source 44 may be considered to be a high-performance data source. In some circumstances, the first light source 34 may provide higher light intensity than the second light source 44 for illumination purposes, but the second light source 44 may have higher performance with regard to data transmission.

The first light source 34 produces light having a first wavelength that is in the visible light spectrum. The visible light spectrum may include wavelengths in the range of about 400 to 700 nm. Since the light produced by the first light source 34 is part of the visible light spectrum, the first light source 34 provides light that may be used for the purposes of illumination. The second light source 44 provides light in the infrared spectrum (for example, between about 700 nm to 1 mm). The light produced by the second light source 44 is not visible to the human eye.

Figure 3:
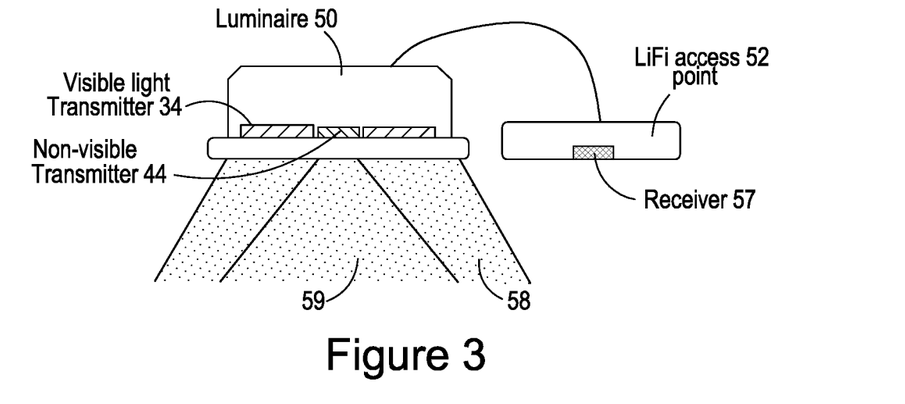
FIG. 3 is a schematic diagram of an optical wireless transmitter apparatus comprising a luminaire and associated access point.

The transmitter apparatus 10 produces visible light from the first light source 34 and non-visible light from the second light source 44. The visible light from the first light source 34 is used to transmit data on the first optical communication channel 12 as shown in FIG. 3. The non-visible light from the second light source 44 is used to transmit data on the second optical communication channel 14. Different data is carried on the first and second optical communication channels 12, 14.

In some embodiments, the MAC layer 22 is configured to send data to the first PHY layer 24 and/or second PHY layer 26 in dependence on at least one property of the data to be transmitted and/or in dependence on at least one property of a receiver (for example, station) to which the data is to be transmitted. The MAC layer 22 may select one or both of the first PHY layer 24 and second PHY layer 26 for transmission of particular data. For example, the MAC layer 22 may select the PHY layer 24, 26 on which data is to be transmitted depending on a volume of data to be transmitted or a type of data to be transmitted.

We note that when we refer to the MAC layer 22 as selecting a PHY layer 24, 26 to which to send the data, the decision is made by an algorithm or software that provides the MAC layer functionality.

In one embodiment the MAC layer 22 selects the second PHY layer 26, driving the second light source 44, if a high performance connection is required. The second light source 44 may be used for high-bandwidth data transmission. The MAC layer 22 selects the first PHY layer 24, driving the first light source 24, if data transmission at a lower bandwidth is required. By using the lower performance first light source 34, more efficient transmission may be obtained.

The power consumed by the associated PHY logic may be less when the lower performance first light source 34 is used than when the higher performance second light source 44 is used. Power savings may result from the PHY layer operating in a lower performance mode. Although the luminaire may consume more power overall when the first light source is used than when the second light source is used, it may be the case that the power from the first light source may be disregarded when comparing power consumption, since the first light source may also provide a desired illumination.

Significant power savings may be achieved by only utilising the higher-power second PHY layer 26 and second light source 44 when high speed applications or devices are in use, and turning off the second PHY layer 26 and second light source 44 when the higher speed is not required, for example when there are only low speed devices in the network.

The use of the system described above with reference to FIG. 2 may address the case where communication is to take place over two or more channels that differ significantly in their characteristics and/or capacity. Unlike WDM or MIMO, in which performance characteristics of all channels used may be the same or similar, the embodiment of FIG. 2 may allow data to be sent over channels having very different characteristics and/or capability. Data may be allocated to one or both of the channels based on the characteristics and/or capability of that channel. The use of two PHY layers may allow different protocols to be used on the different channels.

In one embodiment, the MAC layer 22 selects whether to send data using the first PHY layer 24 and/or second PHY layer 26 based on backward compatibility. For example, a receiver device to which data is to be sent may only be able to receive light from one of the first light source 34 and second light source 44, and may not be able to receive light from the other of the first light source 34 and second light source 44. The MAC layer 22 may select the PHY layer 24, 26 that drives the light source 34, 44 having the appropriate wavelength for that receiver.

In some embodiments, the MAC layer 22 selects the first PHY layer 24 and/or second PHY layer 26 for sending data based on security considerations. For example, one of the first and second light sources 34, 44 may be more directive than the other. The MAC layer 22 may select the PHY layer 24, 26 that drives the more directive light source 34, 44, so that secure data is only sent over a limited spatial area.

In further embodiments, the MAC layer 22 may select the first PHY layer 24 and/or second PHY layer in response to illumination requirements. For example, a non-visible light source may be used for communication in low light or no light environments.

In other embodiments, the MAC layer 22 may select the first PHY layer 24 and/or second PHY layer 26 based on traffic and/or user prioritisation. For example, use of a secondary channel may be granted to privileged users and not to other users. Use of a secondary channel may be granted to particular traffic classes and/or traffic flows.

In further embodiments, any suitable component of the transmitter apparatus 10 may determine whether to send data to the first PHY layer 24, to the second PHY layer 26, or to both the first and the second PHY layers.

In many embodiments, the transmitter apparatus 10 also functions as a receiver. Light is both transmitted and received over each of the optical communication channels 12, 14. On each of the optical communication channels 12, 14, a different wavelength may be used for uplink data than is used for downlink data, which may enable full-duplex communication to take place on each channel.

The transmitter apparatus 10 may comprise at least one receiving device, for example at least one photodiode. In one embodiment, the transmitter apparatus 10 comprises two receiving devices configured to receive signals at different wavelengths. Each of the PHY layers 24, 26 is configured to receive data from a respective receiving device. The MAC layer 22 is configured to receive PHY layer data from the first and second PHY layers 24, 26 and to pass the PHY layer data to the network via the network connection 28.

Figure 4:
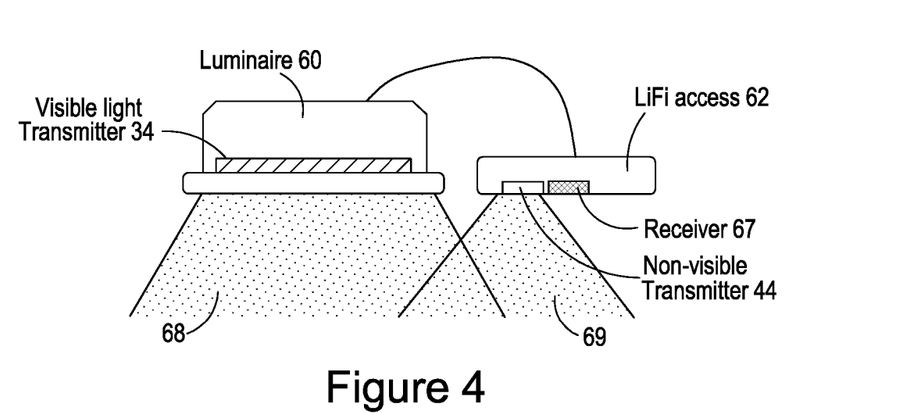
FIG. 4 is a schematic diagram of an optical wireless transmitter apparatus comprising a luminaire and an access point.

Specific configurations of a transmitter apparatus are now described with reference to FIGS. 3 and 4. In FIGS. 3 and 4, the transmitter apparatus is a transceiver apparatus that is configured to transmit and to receive OWC data.

FIG. 3 is a schematic diagram of a transmitter apparatus comprising a luminaire 50 and an associated access point 52. The luminaire 50 and access point 52 are positioned side-by-side. For example, the luminaire 50 and access point 52 may be mounted side-by-side on a ceiling. The luminaire 50 comprises the first light source 34 and second light source 44. The access point 52 comprises the baseband chip 20. In other embodiments, the baseband chip 20 may be positioned in the luminaire 50.

The access point 52 further comprises a receiver 57 that is configured to receive OWC signals, for example to receive uplink signals from a user device (not shown). The first light source 34 provides both illumination and OWC communication. The second light source 44 operates at a wavelength that is invisible to the human eye. The second light source 44 is incorporated directly into the luminaire 50 alongside conventional illumination devices 34. The luminaire 50 is a custom luminaire that is configured to include both light sources 34, 44.

FIG. 3 represents a region of visible light 58 transmitted from the first light source 34, and a region of non-visible light 59 transmitted from the second light source 44. A coverage area of a light source 34, 44 may be an area in which light provided by that light source may be received. For example, in the case of overhead lighting, the coverage area may be a floor area in which light provided by a light source in a luminaire may be received. By incorporating the second light source 44 into the luminaire 50 along with the first light source 34, a coverage area provided by the non-visible light may be similar to a coverage area provided by the visible light.

FIG. 4 is a schematic diagram of a further transmitter apparatus comprising a luminaire 60 and an access point 62 which are positioned side-by-side. The luminaire 60 comprises a first light source 34 which comprises a source of visible light. The access point 62 comprises a second light source 44 which comprises a source of non-visible light and a receiver 67 that is configured to receive OWC signals, for example to receive uplink signals from a user device (not shown).

The configuration of the transmitter apparatus of FIG. 4 may allow use of a luminaire 60 that is not modified to output both visible and non-visible light, for example any luminaire that is capable of being used for OWC communication. The luminaire 60 may be described as an unmodified luminaire. The luminaire 60 may be a luminaire 60 that is designed primarily for illumination purposes, for example a conventional LED luminaire.

FIG. 4 represents a region of visible light 68 transmitted from the first light source 34, and a region of non-visible light 69 transmitted from the second light source 44. In the configuration shown in FIG. 4, the areas of coverage provided by the first light source 34 and second light source 44 may differ since the first light source 34 and second light source 44 are integrated into different devices and are therefore spatially offset. In some embodiments, spatially offset light sources may be used to provide data to receivers that are separated in space.

In further embodiments, a single baseband chip (for example, as described above with reference to FIG. 2) may drive two or more separate luminaires. In some embodiments, a first, visible light source 34 is located in one luminaire 60 and a second light source 44 configured to transmit non-visible light is located within a further luminaire. The luminaire 60, further luminaire, and access point 62 may each be separate units. In further embodiments, the baseband chip may drive any suitable number of light sources positioned in any number of luminaires.

Although two PHY layers 24, 26 are described above, in further embodiments any suitable number of PHY layers may be supported by a single unified MAC layer. For example, three or four PHY layers may be supported by a single unified MAC layer. The three or four PHY layers may be used to produce three or four data streams.

In general, by using a single unified MAC layer in combination with two or more PHY layers, transmission to a mix of devices may be performed without the network layer having to know which devices the data is to be sent to, or what type of communication channel is to be used. This may be abstracted by the unified MAC layer 22. By using two or more PHY layers, different PHY protocols may be used. Different modulation schemes may be used by the different PHY layers.

Although some embodiments above describe specific first and second components (for example, first and second PHY layers and first and second light sources), in other embodiments, the first and second components may be reversed.

A skilled person will appreciate that variations of the enclosed arrangement are possible without departing from the invention. Accordingly, the above description of the specific embodiment is made by way of example only and not for the purposes of limitations. It will be clear to the skilled person that minor modifications may be made without significant changes to the operation described.

The invention claimed is:

1. An optical wireless communication (OWC) transmitter comprising a baseband chip comprising:
   a single unified media access control (MAC) layer configured to receive data from a network;
   a first physical (PHY) layer associated with a first light source; and
   a second physical (PHY) layer associated with a second light source; wherein
   the first PHY layer is configured to receive first data from the MAC layer and provide a first signal to the first light source, so as to drive the first light source to emit first modulated light that comprises or is representative of the first data;
   the second PHY layer is configured to receive second data from the MAC layer and provide a second signal to the second light source, so as to drive the second light source to emit second modulated light that comprises or is representative of the second data; and
   the single unified MAC layer is configured to control the transmission of data to the first PHY layer and the second PHY layer so that a network layer does not determine by which of the first PHY layer or the second PHY layer the data is sent.

2. The transmitter according to claim 1, wherein the first modulated light is visible light and the second modulated light is non-visible light.

3. The transmitter according to claim 1, wherein the first light source comprises at least one light-emitting diode (LED) and the second light source comprises at least one of: a laser, a vertical-cavity surface-emitting laser (VCSEL), a VCSEL array.

4. The transmitter according to claim 1, wherein the first data is different from the second data.

5. The transmitter according to claim 1, wherein the first and second PHY layers are configured to operate substantially simultaneously, such that the first modulated light and second modulated light are emitted substantially simultaneously.

6. The transmitter according to claim 1, wherein the second light source has a higher performance than the first light source.

7. The transmitter according to claim 6, wherein the second light source is switched off when the higher performance is not required.

8. The transmitter according to claim 1, wherein the first light source has a different field of view than the second light source.

9. The transmitter according to claim 1, wherein the first light source has a different orientation to the second light source.

10. The transmitter according to claim 1, wherein the first and second modulated light are each modulated with a respective modulation scheme comprising at least one of on-off keying (OOK), phase shift keying (PSK), M-ary pulse amplitude modulation (M-PAM), M-ary quadrature amplitude modulation (M-QAM) or orthogonal frequency division multiplexing (OFDM), Discrete Hartley transformation, Wavelet packet division multiplexing (WPDM), Hadamard coded modulation (HCM), pulse-position modulation (PPM), Colour shift keying (CSK), carrier-less amplitude and phase (CAP), discrete multi-tone (DMT).

11. The transmitter according to claim 1, wherein the transmitter comprises or forms part of an OWC access point.

12. The transmitter according to claim 1, wherein the transmitter is integrated into a luminaire comprising the first and/or second light sources.

13. A system comprising the transmitter according to claim 1 and a OWC receiver apparatus, the OWC receiver apparatus comprising at least one receiving device configured to receive at least part of the first modulated light and second modulated light emitted by the first light source and second light source.

14. The system according to claim 13, wherein the at least one receiving device comprises a first receiving device configured to receive the at least part of the first modulated light, and a second receiving device configured to receive the at least part of the second modulated light.

15. The system according to claim 14, wherein the second receiving device has a higher gain and/or sensitivity than the first receiving device.

16. The transmitter according to claim 1, wherein the single unified MAC layer is configured to send data to at least one of the first PHY layer or second PHY layer, in dependence on at least one property of the data to be transmitted.

17. The transmitter according to claim 1, where a PHY protocol supported by the first PHY layer is different to a PHY protocol supported by the second PHY layer.

18. A baseband chip comprising:
   A single unified media access control (MAC) layer configured to receive data from a network;
   a first physical (PHY) layer associated with a first light source; and
   a second physical (PHY) layer associated with a second light source; wherein
   the first PHY layer is configured to receive first data from the MAC layer and provide a first signal to the first light source, so as to drive the first light source to emit first modulated light that comprises or is representative of the first data;
   the second PHY layer is configured to receive second data from the MAC layer and provide a second signal to the second light source, so as to drive the second light source to emit second modulated light that comprises or is representative of the second data; and
   the single unified MAC layer is configured to control the transmission of data to the first PHY layer and the second PHY layer so that a network layer does not determine by which of the first PHY layer or the second PHY layer the data is sent.

19. A method of data transmission by optical wireless communication, comprising
   receiving by a single unified MAC layer data from a network;
   controlling transmission of data to a first PHY layer and a second PHY layer by the single unified MAC layer so that a network layer does not determine by which of the first PHY layer or the second PHY layer the data is sent;

receiving by the first PHY layer first data from the single unified MAC layer;
providing by the first PHY layer a first signal to a first light source, so as to drive the first light source to emit first modulated light that comprises or is representative of the first data;
receiving by the second PHY layer second data from the single unified MAC layer; and
providing by the second PHY layer a second signal to a second light source, so as to drive the second light source to emit second modulated light that comprises or is representative of the second data.

* * * * *